(12) United States Patent
Nakagawara

(10) Patent No.: US 6,181,365 B1
(45) Date of Patent: Jan. 30, 2001

(54) RF OUTPUT DEVICE FOR CATV

(75) Inventor: Chikashi Nakagawara, Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/403,874

(22) PCT Filed: Apr. 28, 1998

(86) PCT No.: PCT/JP98/01950
§ 371 Date: Oct. 28, 1999
§ 102(e) Date: Oct. 28, 1999

(87) PCT Pub. No.: WO98/49836
PCT Pub. Date: Nov. 5, 1998

(30) Foreign Application Priority Data

Apr. 28, 1997 (JP) .................................................. 9-111422

(51) Int. Cl.[7] .................................................. H04N 7/10
(52) U.S. Cl. .................................................. 348/6; 348/12
(58) Field of Search .................................. 348/6, 12, 13, 348/552, 723, 724; 455/114, 119, 116, 120, 123, 125

(56) References Cited

U.S. PATENT DOCUMENTS 5,893,024 * 4/1999 Sanders et al. ...................... 455/5.1
6,049,693 * 1/2000 Baran et al. ............................ 455/3.1

FOREIGN PATENT DOCUMENTS

| 63-52533 | 3/1988 | (JP) . |
| 63-198493 | 8/1988 | (JP) . |
| 4-98989 | 3/1992 | (JP) . |
| 5-304672 | 11/1993 | (JP) . |
| 6-93620 | 11/1994 | (JP) . |
| 9-200277 | 7/1997 | (JP) . |

* cited by examiner

*Primary Examiner*—Nathan Flynn
*Assistant Examiner*—Ngoc Vu
(74) *Attorney, Agent, or Firm*—Pillsbury Madison & Sutro Intellectual Property

(57) ABSTRACT

A RF output device for CATV processing having a switch provided on the upstream line in a cable modem. Data is transmitted from each household PC through the upstream line to a base station at a final stage having the highest possible signal level so as to transmit the output of the switch to an output terminal through a buffer circuit. Thereby, the performance of the RF output device is improved and the cost of the RF output device is reduced, based upon the minimized noise level when the switch is turned to an off state, and carrier leakage is prevented without having an oscillation stopping switch present for the voltage controlled oscillator.

8 Claims, 2 Drawing Sheets

RF OUTPUT DEVICE FOR CATV

TECHNICAL FIELD

The present invention relates to PC-online that makes use of a CATV line as a data line of PCs (personal computers). In particular the present invention relates to a RF output device for CATV that outputs signal from PC side to a cable line.

BACKGROUND ART

In PC-online, the frequency band that is not used so far in CATV broadcasting, 5 to 50 MHz band for instance, is frequency-division multiplexing and time-division multiplexing to utilize in two-way data transmission. TV broadcasting and data transmission are carried out in the same cable. Consequently, in an upstream line transmitting data from each household PC to a base station, without precise control of signal frequency, signal level or timing, a problem may be caused on transmission quality or the like of other data transmission or TV broadcasting.

Other problems, such as signal level variation or distortion of the signal in the cable, may occur due to an impedance mismatch. The output impedance may vary based upon whether data is transmitted. In order to avoid this, problem output impedance of each household PC should be kept at a constant value. In addition, since output terminals of several hundred sets of PCs are always connected to the cables, summation this is a of all noises caused therefrom, that is, streamed noise becomes a problem. FIG. 5 shows a RF output device for use with an upstream line of an existing PC-online.

In FIG. 5, first, in an up-converter 1, signal a modulated based on transmission data, for instance, QPSK (Quarternary Phase Shift Keying) is input in one end and a carrier from an oscillator 2 is input in the other end, followed by up-conversion of the input modulated signal to a prescribed frequency. Then, with an RF switch 3 on/off the signal is carried out and with a selection filter 4 due to such as SAW (surface acoustic wave) excellent in selectivity unnecessary frequency component is removed. At a down-converter 6 in which the output signal from the selection filter 4 is input as one input and output of a VCO (Voltage Controlled Oscillator) 5 is input as the other input, of the down converter 6 the frequency of the output signal from the selection filter 4 is shifted to a prescribed frequency. Here, the VCO 5 is frequency-controlled by a PLL (Phase-Locked Loop) circuit 7 and can output arbitrary frequencies due to control from the PC.

An image frequency component of the down-converter 6 output is removed of the down-converter 6 of the down converter 6 output by an image filter 8, and after adjustment of the signal level by a GCA (Gain Control Amplifier) 9, is output with a prescribed output impedance.

According to an RF output device thus constituted, since on/off switching of signal is carried out by an RF switch 3 disposed at an interval where frequency is converted for signal selection, direct current level is not influenced due to the on/off switching signal. Accordingly, with a simple diode switch, this function can be materialized. In addition, there is merit that since regardless of on/off of signal circuit operation conditions after the down-converter 6 are constant, the output impedance also becomes constant.

However, the on/off switching signal is carried out at a relatively earlier stage that is remote from the final output terminal and furthermore signal amplification is implemented at a stage after the RF switch 3. Consequently, there is a disadvantage that even when the RF switch 3 is turned off, output noise becomes large due to the noise caused by circuits after the RF switch 3.

This problem can be solved by moving the RF switch 3 to the later stage where signal level is larger. However, a diode switch that will be considered in general has a disadvantage that it can not handle such a large signal. Moreover, it causes a variation in the direct current level due to the on/off switching signal. This variation in the direct the current level causes a change in operation conditions in the later stage which results in a variation in output impedance.

In addition, if the VCO 5 is kept operating during the off state of the RF switch 3, there is a problem of carrier leakage which due to off-setting of the down-converter 6, output of the VCO 5 is output as it is from the down-converter 6. The carrier leakage can not be completely eliminated by the following image filter 8. As a result of this, there is a disadvantage that since the carrier leakage component is equivalent with noise, output noise becomes large.

Accordingly, as shown in FIG. 5, the VCO 5 is required to be furnished with a switch that is not originally required, thereby oscillation being stopped when the RF switch 3 is turned off by switch signal SW.

SUMMARY OF THE INVENTION

An object of the present invention is to provide a RF output device for CATV that solves problems of noise and carrier leakage.

To this end, in the RF output device for CATV of the present invention, a switch is employed in the place of a diode switch and disposed in a final stage where signal level is as large as possible. The output of this switch is output to an output terminal through a buffer circuit for impedance transformation.

Thus, the noise can be made as small as possible during off state of the switch and at the same time an oscillation stopping switch of the VCO that is for prevention of carrier leakage becomes unnecessary to result in an improvement of noise performance and lower device cost.

DESCRIPTION OF SPECIFIC EMBODIMENTS

Figure 1:
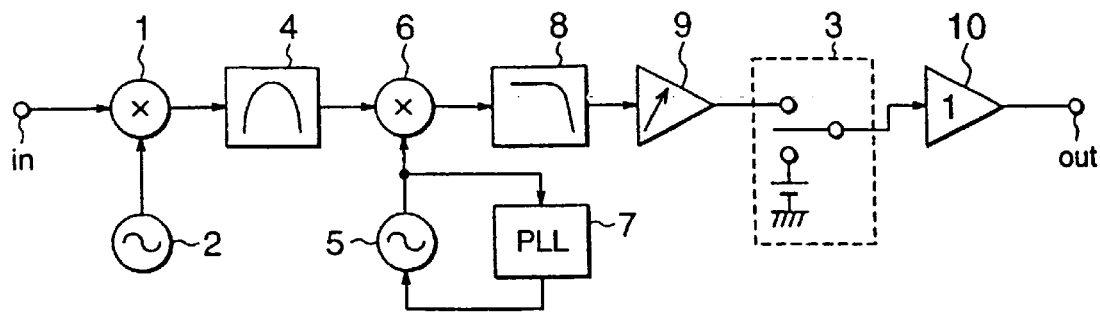
FIG. 1 is a system diagram for explaining one embodiment of the present invention.

In the following, embodiments of the present invention will be explained in detail with reference to the drawings. FIG. 1 is a system diagram for explaining one embodiment of the present invention. In FIG. 1, an up-converter 1 to which one input signal modulated based on transmission data is input from an input terminal in and to which other input carrier is input from an oscillator 2, up-converts the input modulated signal to a prescribed frequency.

Next, output signal from the up-converter 1 is input in a selection filter 4 to eliminate unnecessary frequency components. In a down-converter 6 to which one input the output signal from the selection filter 4 is input and to which other input the output from the VCO 5 inputted is inputted, the frequency of the output signal from the selection filter 4 is shifted to a prescribed frequency. The VCO 5 is controlled in its frequency by a PLL circuit 7 and can output arbitrary frequency due to control from PCs. The output of the down-converter 6 is removed of image frequency components by an image filter 8 and is regulated in signal level by GCA 9. Thereafter, signal the is turned on/off by a RF switch 3 and is further output from a buffer circuit 10 for impedance transformation with a prescribed output impedance. Here, the RF switch 3 is constituted of a switch.

According to such a construction, the RF switch 3 is disposed at a portion closest to the output terminal out and furthermore the input signal is at a final signal level. Consequently, there is an advantage that during the off state of the RF switch 3, noise generators become the least to result in less output noise. In addition, variation of output impedance due to on/off switching of the RF switch 3, being output through a buffer circuit 10 at the later stage, can be made small enough not to cause any problems.

In addition, by positioning the RF switch 3 after the down-converter 6, the carrier leakage during off time can be cut by the RF switch 3. The VCO 5 is not required to stop during off time accordingly, resulting in circuit decrease.

Figure 2:
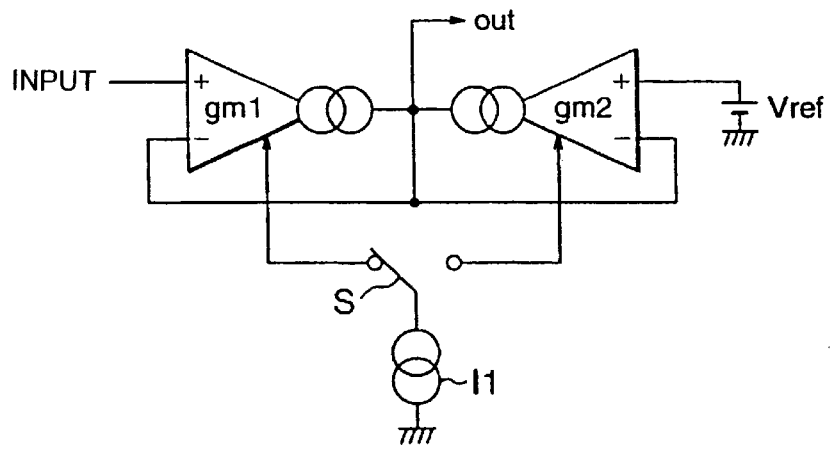
FIG. 2 is a circuit construction diagram for explaining a first concrete example of a switch employed in FIG. 1.

FIG. 2 is a circuit construction diagram for explaining a first preferable concrete example 8 the RF switch 3 of FIG. 1. This switch comprises a common output terminal Out, two transconductors gm1 and gm2, a bias current source I1, and a current switch S for supplying current output thereof to either one of two transconductors gm1 and gm2. Two transconductors gm1 and gm2, at one non-inverted input end-signal being input, at the other end a voltage source Vref being connected, and each inversion input end being connected to the common output terminal Out, respectively, are thereby constructed as a voltage follower.

According to the configured switch of FIG. 2, by operating either one of two transconductors gm1 and gm2 due to the current switch S, voltage of input signal or voltage source Vref can be output in an alternative way to the common output terminal out.

That is, when the transconductor gm1 is operated, since input signal is output from the common output terminal "out", the switch S is in on state. When the transconductor gm2 is operated, since voltage of the voltage source Vref is output from the common output terminal out, the switch S is in off state.

In particular, by approximating the voltage of the voltage source Vref with bias voltage of the input signal, regardless of either one of the transconductors gm1 and gm2 being operated, output bias at the common output terminal out becomes always constant. Consequently, operation conditions at a buffer circuit 10 of later stage also can be made constant. The output impedance can be made constant accordingly.

These, when compared with the existing diode switch, may be considered to be larger in its circuit scale. However, since many inductors and capacitors are actually used to operate a diode switch, the number of parts are hardly different between them. Furthermore, not being required to furnish inductors and capacitors in the switch of FIG. 2, an IC can be easily applied. By replacing the inductors and capacitors in the switch with the IC, there emerges a large advantage such as in cost reduction of the device and downsizing of board area.

Figure 3:
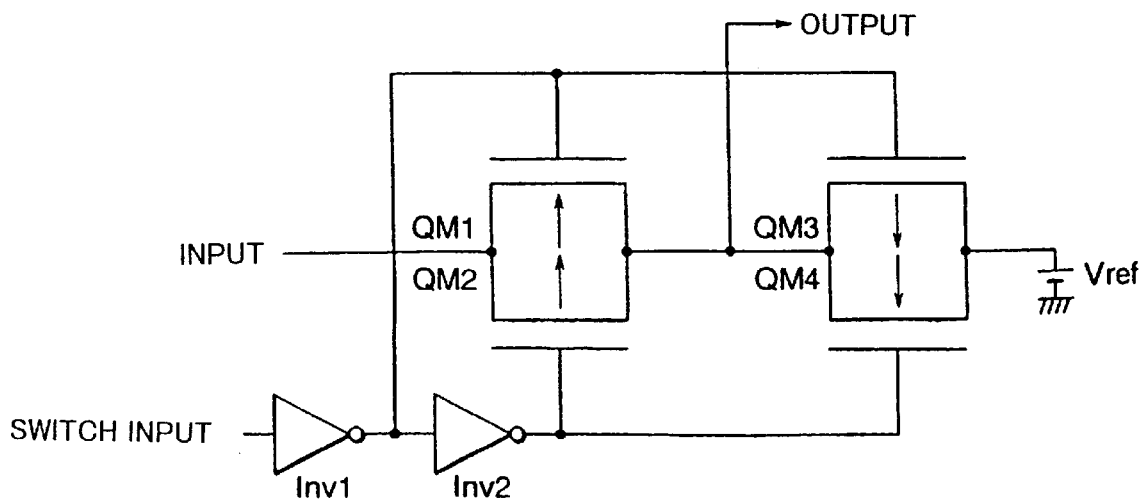
FIG. 3 is a circuit construction diagram for explaining a second concrete example of a switch employed in FIG. 1.

FIG. 3 is a circuit construction diagram for explaining a second concrete example of a switch. This switch comprises two MOS transistor switches QM1 and QM2, and QM3 and QM4 of which common current path ends are an output terminal, and inverters Inv1 and Inv2 for controlling gate voltages thereof by switch signal. Signal is input to the other current path end of one MOS transistor switch QM1 and QM2, and the voltage source Vref is connected to the other current path end of the other MOS transistor switch QM3 and QM4.

According to the configured switch of FIG. 3, due to switch signal two MOS transistor switches turn on and off alternately. Consequently, when one MOS transistor switch QM1 and QM2 is turned on, signal is output from the output terminal, and when the other MOS transistor switch QM3 and QM4 is turned on, the voltage of voltage source Vref is output from the output terminal.

In this concrete example, which is identical with the switch of FIG. 2, by approximating the voltage of the voltage source Vref with the bias voltage of the input signal, the output bias of the common output terminal becomes always constant.

The switch shown in FIG. 3 is a circuit construction suitable for realizing a switch by the use of MOS or BiCMOS process.

Figure 4:
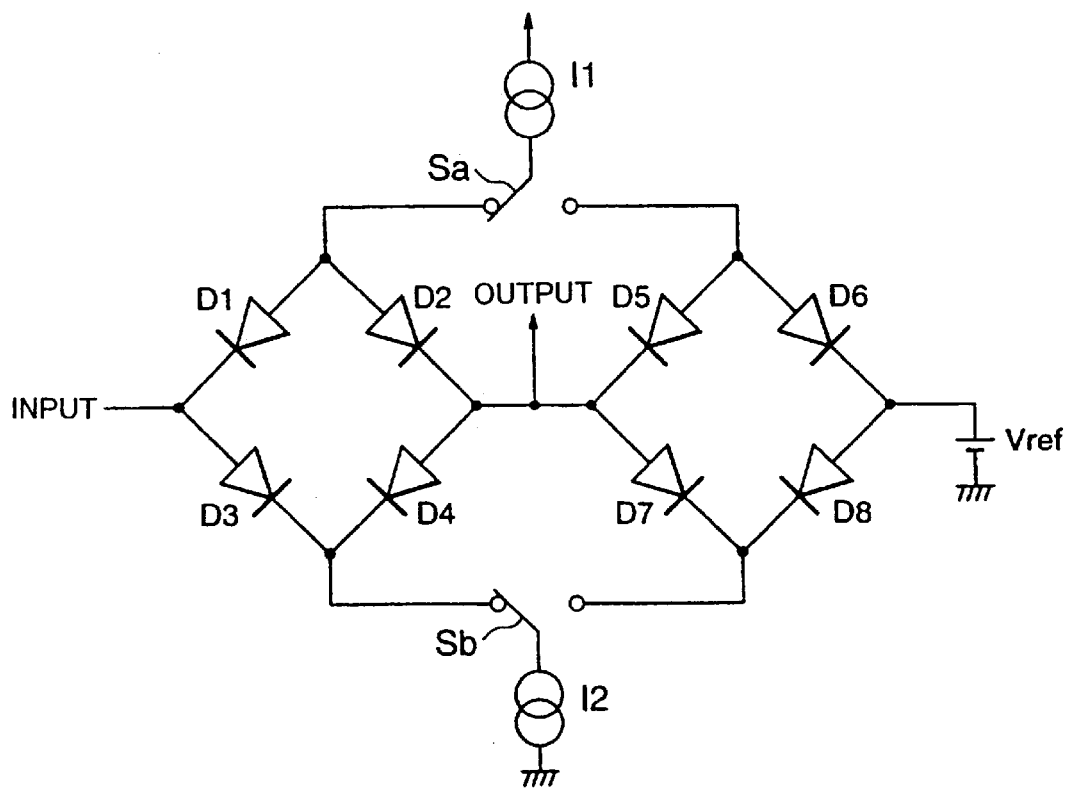
FIG. 4 is a circuit construction diagram for explaining a third concrete example of a switch employed in FIG. 1.
Figure 5:
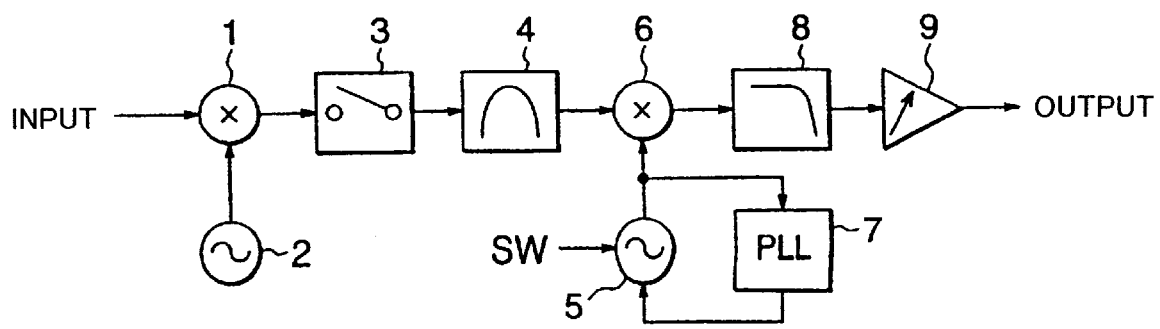
FIG. 5 is a circuit construction diagram for explaining an existing RF output device for CATV.

FIG. 4 is a circuit construction diagram for explaining a third concrete construction example of a switch. This switch comprises two bridge diode switches D1 to D4 and D5 to D8 having a common output terminal, two bias current sources I1 and I2 for controlling the operation thereof, and current switches. Here, the current switches supply two bias current sources I1 and I2 alternately to either one of bridge diode switches. To input terminal of one bridge diode switch D1 to D4 signal is input and to input terminal of the other bridge diode switch D5 to D8 voltage source Vref is connected.

According to the configured switch shown in FIG. 4, due to current switches Sa and Sb, two bridge diode switches D1 to D4 and D5 to D8 are alternately turned on/off. Hence, when one bridge diode switch D1 to D4 is turned on, signal is output from a common output terminal and when the other bridge diode switch D5 to D8 is turned on, the voltage of the voltage source Vref is output from a common output terminal.

In this case too, as identical with the switch shown in FIG. 2, by approximating the voltage of the voltage source Vref with the bias voltage of the input signal, the output bias of the common output terminal becomes always constant.

In the case of FIG. 4, although application of an IC is naturally possible, being capable of constituting almost of diodes, this circuit construction is suitable for discrete use.

As explained in the above, in the present invention, in essence, a switch is employed in the place of a RF switch 3 and disposed at a portion as close to an output terminal as possible, and the output is output through a buffer circuit 10. Thereby, noise and carrier leakage can be improved by maintaining the output bias voltage constant regardless of on/off switching of the switch when the operation conditions are made constant and impedance variation is held as small as possible.

In addition, a RF switch 3 may be serially connected to be in multi-stage construction and thereby the on/off switching may be simultaneously controlled. In this case, being serially connected in multi-stage, parasite capacity of the switch is in a serially connected state by multiplied amount. As a result of this, the signal that leaks through the parasite capacity can be reduced.

Industrial Applicability

As explained above, according to a RF output device for CATV of the present invention, noise performance can be improved, and without resorting to excess circuits the carrier leakage can be made less. In addition, being suitable for application of IC, thereby cost reduction and downsizing of board area can be attained.

What is claimed is:

1. A RF output device for CATV processing of a RF signal for transmission use in an up-stream line in a cable modem provided with a function of carrying out at least the transmission of information through a cable television line, comprising:

a switch positioned between a means of controlling a prescribed output signal level and a means of performing impedance transformation, wherein an output RF signal is provided to the upstream line, said output RF signal having a nearly equal bias voltage during off-time and on-time of said switch when said switch of the RF output device being operated between one of an on-state and off-state;

wherein said switch comprises a common output terminal and two transconductors in which each said output RF signal is input to an inversion input end, said signal being input to a non-inversion input end of one transconductor and non-inversion input end of the other transconductor being connected to a voltage source, said transconductors being alternately switched between one of an on-position and off-position to provide an output signal to said common output terminal.

2. A RF output device for CATV processing of a RF signal for transmission use in an up-stream line in a cable modem provided with a function of carrying out at least the transmission of information through a cable television line comprising:

a switch positioned between a means of controlling a prescribed output signal level and a means of performing impedance transformation, wherein an output RF signal is provided to the upstream line, said output RF signal having a nearly equal bias voltage during off-time and on-time of said switch when said switch of the RF output device being operated between one of an on-state and off-state;

wherein said switch comprises two MOS transistor switches in which common current path ends are a common output terminal, said output RF signal, being input to said current path end of a first MOS transistor switch, said other current path end of a second MOS transistor switch being connected to a voltage source, said two MOS transistor switches being alternately switched between one of an off-position and on-position to provide an output signal to said common current path ends.

3. A RF output device for CATV processing of a RF signal for transmission use in a up-stream line in a cable modem provided with a function of carrying out at least the transmission of information through a cable television line comprising:

a switch positioned between a means of controlling a prescribed output signal level and a means of performing impedance transformation, wherein an output RF signal is provided to the upstream line, said output RF signal having a nearly equal bias voltage during off-time and on-time of said switch when said switch of the RF output device being operated between one of an on-state and off-state;

wherein said switch comprises two bridge diode switches having a common output terminal, said output RF signal being input to an input terminal of a first of said bridge diode switches, and an input terminal of a second of said bridge diode switches being connected to a voltage source, said two bridge diode switches being alternately switched between one of an off-position and on-position to provide an output signal to said common output terminal.

4. A RF output device for CATV processing of a RF signal for transmission use in an up-stream line in a cable modem provided with a function of carrying out at least the transmission of information through a cable television line comprising:

a switch positioned between a means of controlling a prescribed output signal level and a means of performing impedance transformation, wherein an output RF signal is provided to the upstream line, said output RF signal having a nearly equal bias voltage during off-time and on-time of said switch when said switch of the RF output device being operated between one of an on-state and off-state;

wherein said switch is composed of a plurality of switches connected directly in series, said plurality of switches being simultaneously switched between one of an on-position and off-position.

5. The RF output device as set forth in claim 1, further comprising:

a selection filter for eliminating unnecessary frequency components of an input signal;

an up-converter for converting a modulated signal to a prescribed frequency, said modulated signal being received by said up-converter based on transmission data and a carrier signal being transmitted by an oscillator, said up-converter being positioned before said selection filter;

an image filter for removing an image frequency component, said image filter being positioned before said means of controlling a prescribed output signal level; and a down-converter for shifting a received signal to a prescribed frequency, wherein input signals for said down-converter are received from said selection filter and an output signal supplied by a voltage controlled oscillator being controlled by a Phase Locked Loop circuit, said down-converter being positioned before said image filter.

6. The RF output device as set forth in claim 2, further comprising:

a selection filter for eliminating unnecessary frequency components of an input signal;

an up-converter for converting a modulated signal to a prescribed frequency, said modulated signal being received by said up-converter based on transmission data and a carrier signal being transmitted by an oscillator, said up-converter being positioned before said selection filter;

an image filter for removing an image frequency component, said image filter being positioned before said means of controlling a prescribed output signal level; and a down-converter for shifting a received signal to a prescribed frequency, wherein input signals for said down-converter are received from said selection filter and an output signal supplied by a voltage controlled oscillator being controlled by a Phase Locked Loop circuit, said down-converter being positioned before said image filter.

7. The RF output device as set forth in claim 3, further comprising:
   a selection filter for eliminating unnecessary frequency components of an input signal;
   an up-converter for converting a modulated signal to a prescribed frequency, said modulated signal being received by said up-converter based on transmission data and a carrier signal being transmitted by an oscillator, said up-converter being positioned before said selection filter;
   an image filter for removing an image frequency component, said image filter being positioned before said means of controlling a prescribed output signal level; and
   a down-converter for shifting a received signal to a prescribed frequency, wherein input signals for said down-converter are received from said selection filter and an output signal supplied by a voltage controlled oscillator being controlled by a Phase Locked Loop circuit, said down-converter being positioned before said image filter.

8. The RF output device as set forth in claim 4, further comprising:
   a selection filter for eliminating unnecessary frequency components of an input signal;
   an up-converter for converting a modulated signal to a prescribed frequency, said modulated signal being received by said up-converter based on transmission data and a carrier signal being transmitted by an oscillator, said up-converter being positioned before said selection filter;
   an image filter for removing an image frequency component, said image filter being positioned before said means of controlling a prescribed output signal level; and
   a down-converter for shifting a received signal to a prescribed frequency, wherein input signals for said down-converter are received from said selection filter and an output signal supplied by a voltage controlled oscillator being controlled by a Phase Locked Loop circuit, said down-converter being positioned before said image filter.

* * * * *